United States Patent
Kuehner

(10) Patent No.: US 11,686,574 B2
(45) Date of Patent: Jun. 27, 2023

(54) DEFORMABLE SENSORS AND METHODS FOR MODIFYING RUN-TIME MEMBRANE STIFFNESS

(71) Applicant: Toyota Research Institute, Inc., Los Altos, CA (US)

(72) Inventor: Manuel L. Kuehner, Mountain View, CA (US)

(73) Assignee: TOYOTA RESEARCH INSTITUTE, INC, Los Altos, CA (US)

(*) Notice: Subject to any disclaimer, the term of this patent is extended or adjusted under 35 U.S.C. 154(b) by 168 days.

(21) Appl. No.: 17/380,153

(22) Filed: Jul. 20, 2021

(65) Prior Publication Data

US 2023/0026266 A1 Jan. 26, 2023

(51) Int. Cl.
*G01B 11/16* (2006.01)
*G01L 1/24* (2006.01)
*G01L 5/00* (2006.01)
*B25J 13/08* (2006.01)

(52) U.S. Cl.
CPC ............. *G01B 11/16* (2013.01); *G01L 1/24* (2013.01); *B25J 13/082* (2013.01); *G01L 5/009* (2013.01)

(58) Field of Classification Search
CPC .......... G01B 11/16; G01L 1/24; G01L 5/009; G01L 1/04; B25J 13/082; B25J 13/084
USPC .......................................................... 356/32
See application file for complete search history.

(56) References Cited

U.S. PATENT DOCUMENTS

| 4,788,868 A | 12/1988 | Wilk | |
|---|---|---|---|
| 8,411,140 B2* | 4/2013 | Adelson | A61B 5/1172 348/135 |
| 8,505,822 B2 | 8/2013 | Wang et al. | |
| 10,549,428 B2* | 2/2020 | Alspach | B25J 9/1633 |
| 10,668,627 B2* | 6/2020 | Alspach | G01B 11/16 |
| 11,007,652 B2* | 5/2021 | Alspach | G01L 5/0061 |
| 11,465,296 B2* | 10/2022 | Alspach | G01L 5/009 |
| 2012/0240691 A1* | 9/2012 | Wettels | G01L 1/24 73/862.624 |
| 2013/0070074 A1* | 3/2013 | Won | G02B 6/0013 382/128 |

(Continued)

FOREIGN PATENT DOCUMENTS

CN 103522295 A 1/2014

OTHER PUBLICATIONS

Alspach, A., et al., "Soft-bubble: A highly compliant dense geometry tactile sensor for robot manipulation", https://arxiv.org/abs/1904.02252, 2019.

(Continued)

*Primary Examiner* — Roy M Punnoose
(74) *Attorney, Agent, or Firm* — Dinsmore & Shohl LLP

(57) ABSTRACT

Deformable sensors and methods for modifying membrane stiffness are provided. A deformable sensor may include a membrane coupled to a housing to form a sensor cavity. The deformable sensor may further include a rotational element having an adjustable vertical position and a modifiable rotation. The rotational element may be supported at a base of the sensor cavity. The rotational element may be configured to establish and withdraw contact with respect to the membrane to modify stiffness of the membrane. The rotational element may further be configured to modify stiffness of the membrane by withdrawing the rotational element from the membrane.

20 Claims, 10 Drawing Sheets

(56) References Cited

U.S. PATENT DOCUMENTS

| | | | |
|---|---|---|---|
| 2013/0180344 A1* | 7/2013 | Lee | G01L 9/12 |
| | | | 29/25.42 |
| 2019/0091871 A1* | 3/2019 | Alspach | B25J 13/084 |
| 2019/0091872 A1* | 3/2019 | Alspach | B25J 13/084 |
| 2020/0254624 A1* | 8/2020 | Alspach | B25J 13/085 |
| 2021/0245369 A1* | 8/2021 | Alspach | G01B 11/16 |
| 2021/0299886 A1* | 9/2021 | Alspach | G01L 1/24 |
| 2021/0302248 A1* | 9/2021 | Alspach | G01B 11/165 |
| 2021/0302249 A1* | 9/2021 | Alspach | G01B 21/042 |
| 2021/0302255 A1* | 9/2021 | Alspach | G01B 11/24 |
| 2022/0024048 A1* | 1/2022 | Ambrus | B25J 9/1612 |
| 2022/0234212 A1* | 7/2022 | Agnihotri | G06F 3/0304 |
| 2023/0021848 A1* | 1/2023 | Kuehner | B25J 13/084 |

OTHER PUBLICATIONS

Kuppuswamy, N., et al., "Soft-Bubble grippers for robust and perceptive manipulation", https://arxiv.org/abs/2004.03691, 2020.

Kuppuswamy, N., et al., "Fast Model-Based Contact Patch and Pose Estimation for Highly Deformable Dense-Geometry Tactile Sensors", IEEE Robotics and Automation Letters 5, No. 2 (4), 10.1109/LRA.2019.2961050, 2020.

Toyota Research Institute (TRI), "Sensing is Believing: More Capable Robot Hands with the Soft Bubble Gripper", https://www.tri.global/news/sensing-is-believing-more-sensitive-robot-hands-t-2020-9-9/, 2020.

* cited by examiner

DEFORMABLE SENSORS AND METHODS FOR MODIFYING RUN-TIME MEMBRANE STIFFNESS

TECHNICAL FIELD

Embodiments described herein generally relate to contact sensors and, more particularly, to deformable contact and geometry/pose sensors capable of detecting contact and a geometry of an object. Embodiments also relate to robots incorporating deformable contact and geometry sensors. Deformability may refer, for example, stiffness and/or the ease of deformation of deformable sensors. A deformable sensor may have a fixed or variable stiffness. The amount of stiffness of a deformable sensor can impact its suitability for manipulating objects of varying fragility.

BACKGROUND

Contact sensors are used to determine whether or not one object is in physical contact with another object. For example, robots often use contact sensors to determine whether a portion of the robot is in contact with an object. Control of the robot may then be based at least in part on signals from one or more contact sensors. As robots navigate environments, the ability to modify aspects their interaction with their environment at "run-time" can provide a significant technical advantage from such rapid adaptation.

SUMMARY

In one embodiment, a deformable sensor may include a membrane coupled to a housing to form a sensor cavity. The deformable sensor may further include a rotational element having an adjustable vertical position and a modifiable rotation. The rotational element may be supported at a base of the sensor cavity. The rotational element may be configured to establish and withdraw contact with respect to the membrane to modify stiffness of the membrane. The rotational element may further be configured to modify stiffness of the membrane by withdrawing the rotational element from the membrane.

In another embodiment, a method may include establishing contact within a deformable sensor between a membrane coupled to a housing to form a sensor cavity and a rotational element comprising an adjustable vertical position and modifiable rotation. The rotational element may be supported at a base of the sensor cavity. The method may further include modifying stiffness of the membrane based upon contact with the rotational element. The method may additionally include modifying the stiffness of the membrane by withdrawing the rotational element from the membrane.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As humans, our sense of touch allows us to determine the shape of an object without looking at the object. Further, our sense of touch provides information as to how to properly grasp and hold an object. Our fingers are more sensitive to touch than other parts of the body, such as arms. This is because we manipulate objects with our hands.

Robots are commonly equipped with end effectors that are configured to perform certain tasks. For example, an end effector of a robotic arm may be configured as a human hand, or as a two-fingered gripper. However, robots do not have varying levels of touch sensitivity as do humans. End effectors may include sensors such as pressure sensors, but such sensors provide limited information about the object that is in contact with the end effector. Thus, the robot may damage a target object by using too much force, or drop the object because it does not properly grasp the object.

Further, in some applications, a deformable/compliant end effector may be desirable. For example, a deformable end effector may be desirable in robot-human interactions. Further, a deformable/compliant end effector may be desirable when the robot manipulates fragile objects. Further still, based upon objects encountered and changing conditions within an environment, it may be desirable to have deformable sensors that can have real-time modification of their stiffness (or force-displacement, used interchangeably herein).

Embodiments of the present disclosure are directed to deformable/compliant contact and/or geometry/bubble sensors (hereinafter "deformable sensors") that not only detect contact with a target object, but also detect the geometry, pose and contact force of the target object. Particularly, the deformable sensors described herein are capable of modifying their stiffness based upon different factors contributing to such stiffness. While deformable sensor stiffness can remain consistent/fixed, a deformable sensor with variable stiffness can allow the deformable sensor to be adaptable in real-time. For example, where objects of varying levels of rigidity or fragility are encountered, adaptable levels of deformable sensor stiffness can provide a real-world, technological benefit. Thus, the deformable sensors described herein provide a robot (or other device) with real-time stiffness modification when manipulating objects (i.e., to modify a stiffness of the soft bubble to change the amount of force required to deform the sensor at runtime).

Figure 1A:
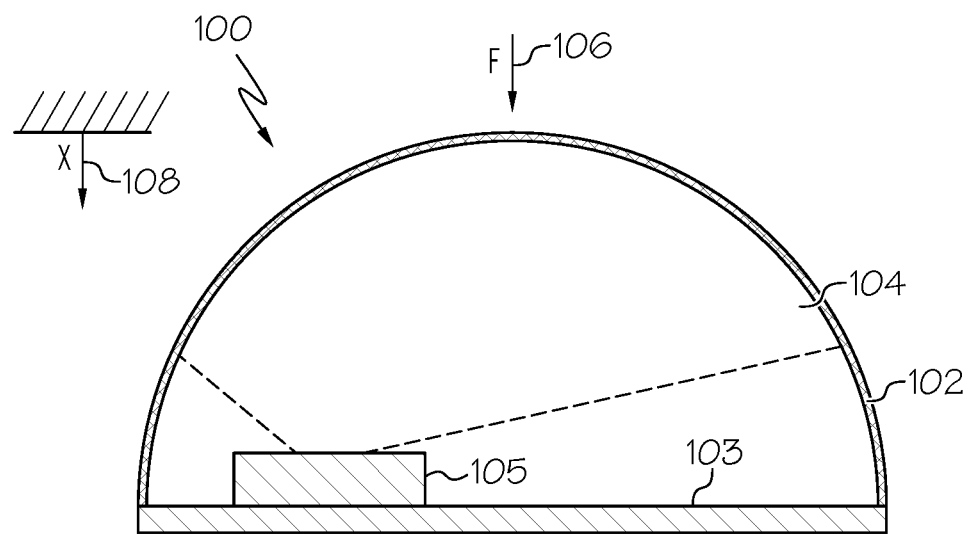
FIG. 1A schematically depicts a side view of an exemplary deformable sensor according to one or more embodiments described and illustrated herein.

Referring now to FIG. 1A, an example deformable sensor 100 is schematically illustrated in a side view. The example deformable sensor 100 generally comprises a housing 103 and a deformable membrane 102 coupled to the housing 103 to define a sensor cavity 104 filled with a medium, such as air, which may affect the stiffness of the deformable sensor 100. Thus, air in the sensor cavity 104 provides pressure such that the deformable membrane 102 forms a dome shape as shown in FIG. 1, although any suitable shape may be utilized in other embodiments. In another example, the medium is a gel, such as silicone or other rubber-like substance. In some embodiments, a substance such as solid silicone may be cast in a given shape before assembly of the deformable sensor 100. In various embodiments, the medium may be anything that is transparent to one or more floor sensors 105, such as to a wavelength utilized by a time of flight sensor or visible light used by a camera. The medium may include clear/transparent rubbers in some embodiments. In other embodiments, the medium may be a liquid. In some examples, the deformable membrane 102 and the medium within the sensor cavity 104 may be fabricated of the same material, such as, without limitation, silicone. In some embodiments, the deformable sensor 100 may be mountable. For example, the housing 103 may include brackets or other suitable fasteners or adhesives to be mounted any suitable object (such as a robot) or material. The deformable membrane 102 may be a latex or any other suitable material, such as a suitably thin, non-porous, rubber-like material. In addition to air inside the sensor cavity 104, the stiffness or deformability of the deformable sensor 100 may be affected by the material of the deformable membrane 102, as discussed in more detail herein. By using a softer material (e.g., soft silicone), the deformable sensor 100 may be more easily deformed. Similarly, lowering the air pressure within the sensor cavity 104 may also cause the deformable membrane 102 to more easily deform, which may in turn provide for a more deformable sensor 100.

The floor sensor 105 may be capable of sensing depth may be disposed within the sensor cavity 104, which may be measured by the depth resolution of the floor sensor 105. The floor sensor 105 may have a field of view directed through the air (or other medium) and toward a bottom surface of the deformable membrane 102, as depicted in FIG. 1A. In some embodiments, the floor sensor 105 may be an optical sensor. The floor sensor 105 may be capable of detecting deflections of the deformable membrane 102 when the deformable membrane 102 comes into contact with an object. In one example, the floor sensor 105 contains a time-of-flight sensor capable of measuring depth. The time-of-flight sensor emits an optical signal (e.g., an infrared signal) and has individual detectors (i.e., "pixels") that detect how long it takes for the reflected signal to return to the sensor. The time-of-flight sensor may have any desired spatial resolution. The greater the number of pixels, the greater the spatial resolution. The spatial resolution of the sensor disposed within the time-of-flight may be changed. In some cases, low spatial resolution (e.g., one "pixel" that detects a single point's displacement) may be desired. In others, a sensitive time-of-flight sensor may be used within a floor sensor 105 that provides dense tactile sensing. Thus, the floor sensor 105 may be modular because the sensors may be changed depending on the application. A non-limiting example of a time-of-flight sensor is the Pico Flexx sold by PMD Technologies AG of Siegen, Germany. Other types of visual internal sensors that may be utilized within the floor sensor 105 include, by way of non-limiting example, stereo cameras, laser range sensors, structured light sensors/3d scanners, single cameras (such as with dots or other patterns inside), or any other suitable type of visual detector. For example, the floor sensor 105 may be configured as a stereo-camera capable of detecting deflections of the deformable membrane 102 by an object.

Although located atop the housing 103 in this embodiment, a floor sensor 105 may be located in any suitable location within or outside of a deformable sensor 100. Any suitable quantity and/or type of floor sensors 105 may be utilized within a single deformable sensor 100 in some embodiments. A floor sensor 105 may contain any suitable quantity of sensors of any suitable type of sensor (motion sensor, rotation sensor, and the like), such that multiple types of sensors may be contained with a floor sensor 105. In some examples, not all floor sensors 105 within a deformable sensor 100 need be of the same type. In some embodiments, the floor sensor 105 may include one or more internal pressure sensors (barometers, pressure sensors, etc., or any combination thereof) utilized to detect the general deformation of the deformable membrane 102 through the medium, which may be used to measure stiffness of the deformable sensor 100 due to air, which may be modified by one or more valves, or any other suitable mechanism for adding and/or removing air or other fluid from the sensor cavity 104.

Figure 1B:
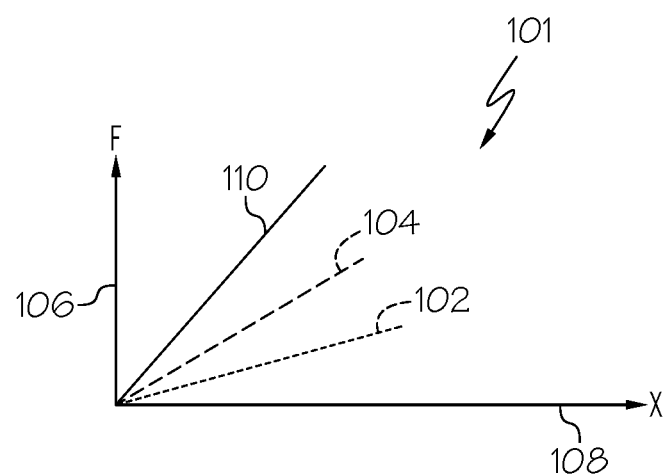
FIG. 1B schematically depicts a graph of fixed force-displacement values for the exemplary deformable sensor depicted by FIG. 1A according to one or more embodiments described and illustrated herein.

Referring now to FIG. 1B, a force-displacement graph 101 plots the force-displacement of the deformable membrane 102, force-displacement due to the air within the sensor cavity 104, and the total force-displacement 110 of the deformable sensor (based on summing these values in terms of force 106 measured over the amount of displacement 108). As shown by the linear relationships in the force-displacement graph 101, the deformable membrane 102 has the lowest amount of stiffness, the sensor cavity 104 has more stiffness, and the total stiffness is the largest, being based on both the deformable membrane and sensor cavity stiffness values. Although depicted in this graph as linear, the force-displacement of the deformable membrane 102, the force-displacement due to the air within the sensor cavity 104, and/or the total force-displacement 110 may be non-linear based on factors such as the shape and size of an object that applies the force on the membrane.

Figure 1C:
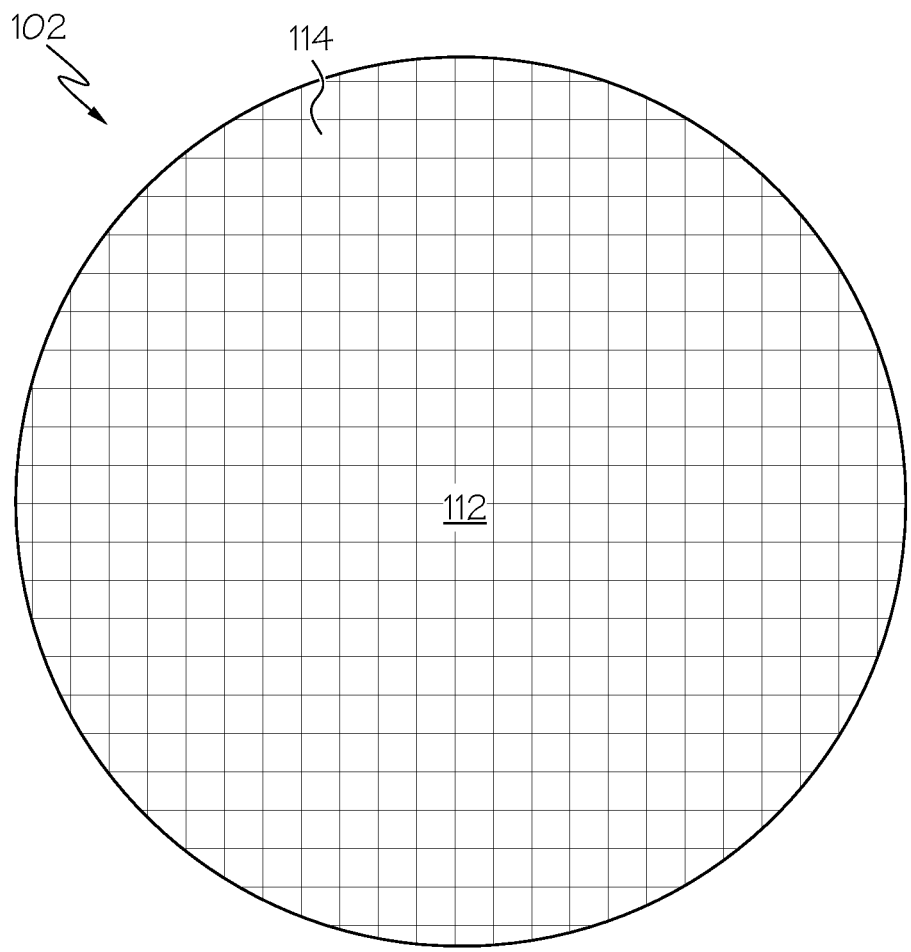
FIG. 1C schematically depicts a pattern on a bottom surface of a deformable membrane of the example deformable sensor depicted by FIG. 1A according to one or more embodiments described and illustrated herein.

Referring now to FIG. 1C, a grid pattern 114 may be applied to a bottom surface 112 of the deformable membrane 102 to assist in the detection of the deformation of the deformable membrane 102. For example, the grid pattern 114 may assist in the detection of the deformation when the floor sensor is a stereo-camera. Varying degrees of distortion to the grid pattern 114 may be utilized to discern how much deformation has occurred. In this example, the distance between parallel lines and/or measuring curvature of lines in the grid pattern 114 may be used to determine the amount of deformation at each point in the grid. It should be understood that embodiments are not limited to grid patterns, as other types of patterns are possible, such as dots, shapes, and the like. The pattern on the bottom surface 112 may be random, and not necessarily arranged in a grid pattern 114 or an array as shown in FIG. 1C.

Figure 2A:
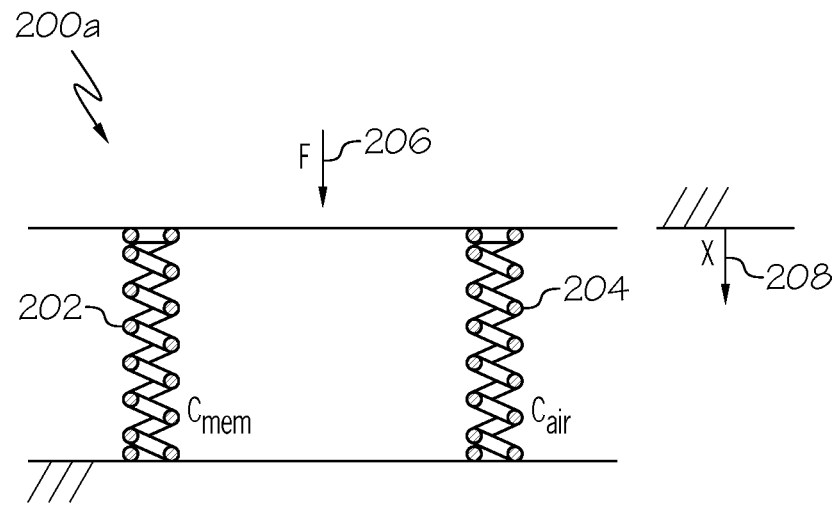
FIG. 2A schematically depicts a force-displacement spring representation of fixed force-displacement of the exemplary deformable sensor depicted by FIG. 1A according to one or more embodiments described and illustrated herein.

Referring now to FIG. 2A, a fixed force-displacement representation 200a depicts consistent stiffness of the deformable sensor as it is subject to an amount of force 206 with respect to a distance/amount of displacement 208 that does not change over time (i.e., potentially linear). The arrows represent the respective directions of the force 206 and displacement 208. In this embodiment, $C_{mem}$ represents fixed membrane force-displacement 202 in the form of a conceptual "spring" symbolizing stiffness of the deformable membrane, and corresponding to the linear air stiffness depicted in 102 FIG. 1B. $C_{air}$ represents fixed air force-displacement 204, corresponding to the linear air stiffness depicted in 104 FIG. 1B. Thus, the amount of resistance or stiffness of the combined deformable membrane force-displacement 202 and fixed air force-displacement 204 remains consistent over time in this example, which is with respect to one specific geometrical position on the membrane surface. This example is a simplification in some embodiments, such that the force-displacement curve here depicts a linear relationship between displacement and force, but this relationship can look different (i.e., non-linear) depending on the shape and the size of the object that applies the force on the membrane.

Figure 2B:
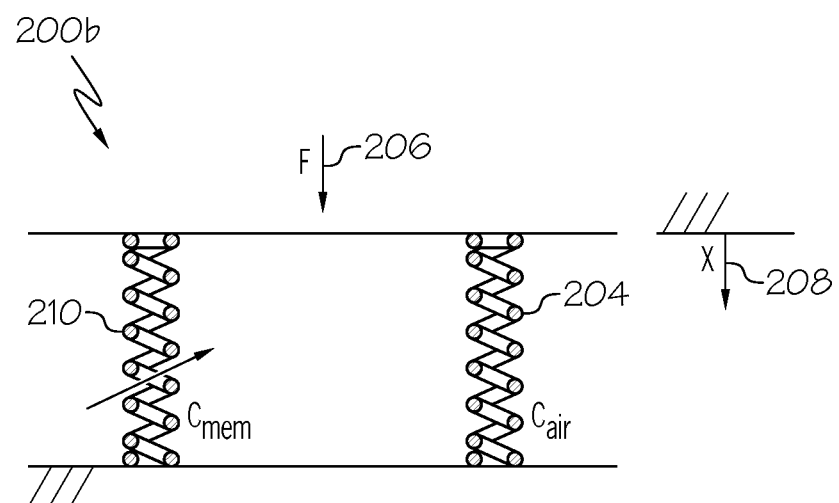
FIG. 2B schematically depicts a spring representation with variable membrane force-displacement with respect to an exemplary deformable sensor according to one or more embodiments described and illustrated herein.

Referring now to FIG. 2B, a variable membrane force-displacement representation 200b depicts the deformable sensor exhibiting variable membrane force-displacement 210, as indicated by the arrow traversing the conceptual spring $C_{mem}$. Here, the amount of force required to create or affect displacement may vary based upon exemplary factors such as changes to how the membrane is secured to the housing, changes to the location on the membrane that force is being applied, and the like. Thus, because the $C_{mem}$ membrane force-displacement 210 is variable, the overall force-displacement of the deformable sensor is also variable, despite the fixed force-displacement $C_{air}$ of the air in the sensor cavity. However, such force-displacement variability may not be available at run-time in some embodiments.

Figure 3:
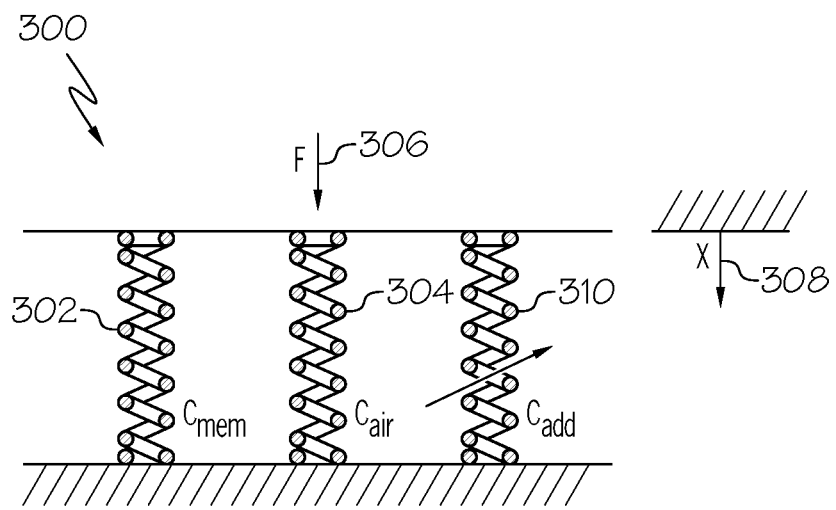
FIG. 3 schematically depicts a spring representation with additional variable force-displacement with respect to an exemplary deformable sensor according to one or more embodiments described and illustrated herein.

Referring now to FIG. 3, an additional variable membrane force-displacement representation 300 depicts a deformable sensor exhibiting a fixed membrane force-displacement 302 represented as a conceptual spring $C_{mem}$. This conceptual spring $C_{mem}$ provides resistance/stiffness with regards to force 306 exerted upon the deformable membrane and the resulting displacement 308. Similarly, another conceptual spring $C_{air}$ represents fixed air force-displacement 304. However, an additional variable force-displacement source 301 is depicted as a third conceptual spring $C_{add}$. The variable force-displacement source 310 provides that the overall force-displacement of the deformable sensor is also variable, despite the fixed force-displacement attributed to both the air in the sensor cavity $C_{air}$ and the membrane $C_{mem}$. As discussed further herein, $C_{add}$ may provide real-time force-displacement variability, which in turn provides the deformable sensor with real-time force-displacement variability.

Figure 4:
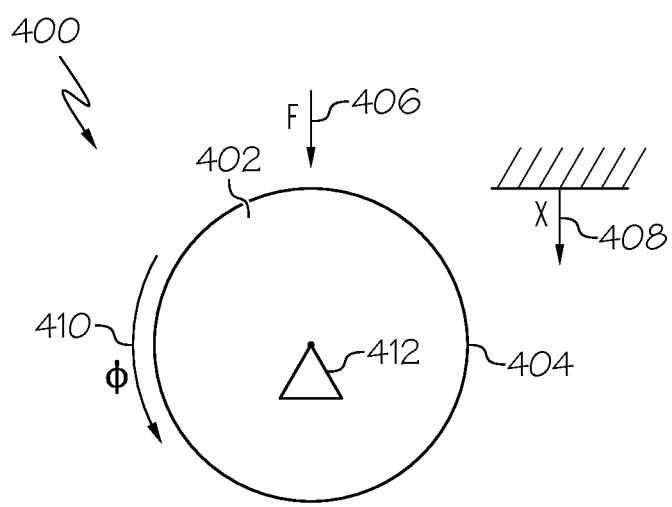
FIG. 4 schematically depicts a rotational element according to one or more embodiments described and illustrated herein.

FIG. 4 depicts a rotational element side view 400. A rotational element 402 may be utilized within the sensor cavity to provide real-time force-displacement variability. As discussed in more detail herein, the rotational element outer surface 404 can apply (and modify) force, pressure, and the like, as a real-time variable force-displacement source against a force 406 being applied to the deformable sensor. In turn, this can diminish the resulting displacement 408 against the deformable sensor in real-time. Specifically, differences in the stiffness (force-displacement) can be applied by different parts of the rotational element outer surface 404 to the deformable membrane. As discussed in more detail herein, the rotational position 410 (denoted as 1) can be modified utilizing an actuation member 412 to in turn modify the force-displacement provided by the particular rotational element outer surface 404, based upon the material used in a particular part of the rotational element 402. While the actuation member 412 is depicted here being near the center of the rotational element 402, other configurations are discussed and illustrated in more detail in other embodiments herein.

Figure 5:
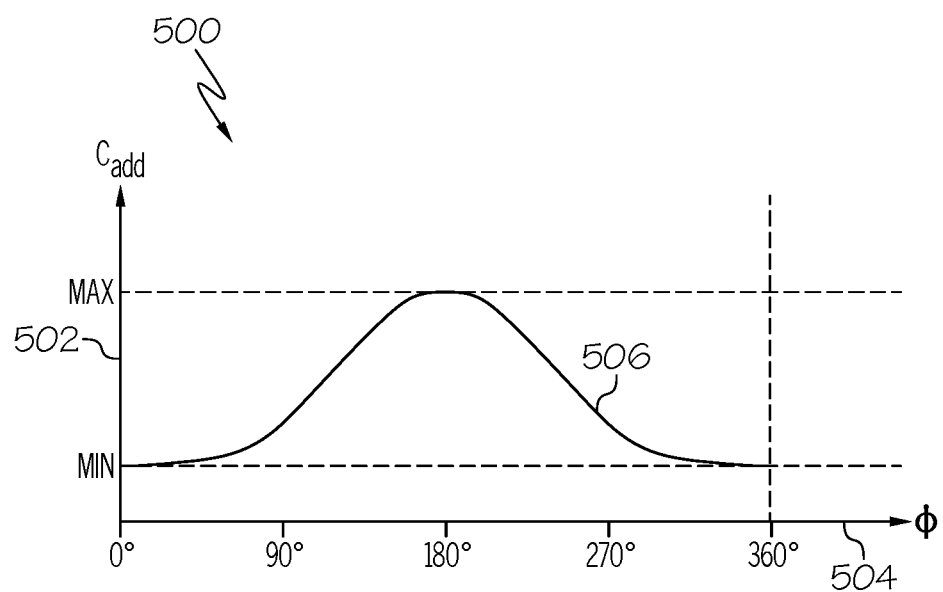
FIG. 5 schematically depicts a rotationally-oriented force-displacement graph according to one or more embodiments described and illustrated herein.

Turning now to FIG. 5, a rotationally-oriented force-displacement graph 500 depicts rotational member force-displacement 502 (in terms of a minimum-maximum range) with respect to the rotational position 504 (degrees in this example) of the rotational element. The force-displacement values 506 are with respect to the angular values (degrees in this example) at the point of contact with the membrane. As shown, the force-displacement values 506 start with minimal force-displacement 502 at the 0° and continually increases until the wheel completes half a revolution at 180°, at which point the maximum force-displacement value 506 is reached. The force-displacement values 506 then continuously decline after 180° until the minimum force-displacement value 506 is reached at 360° when one revolution is completed. The curve of the force-displacement values 506 is explained in more detail below with respect to the material(s) utilized in the rotational member.

Figure 6:
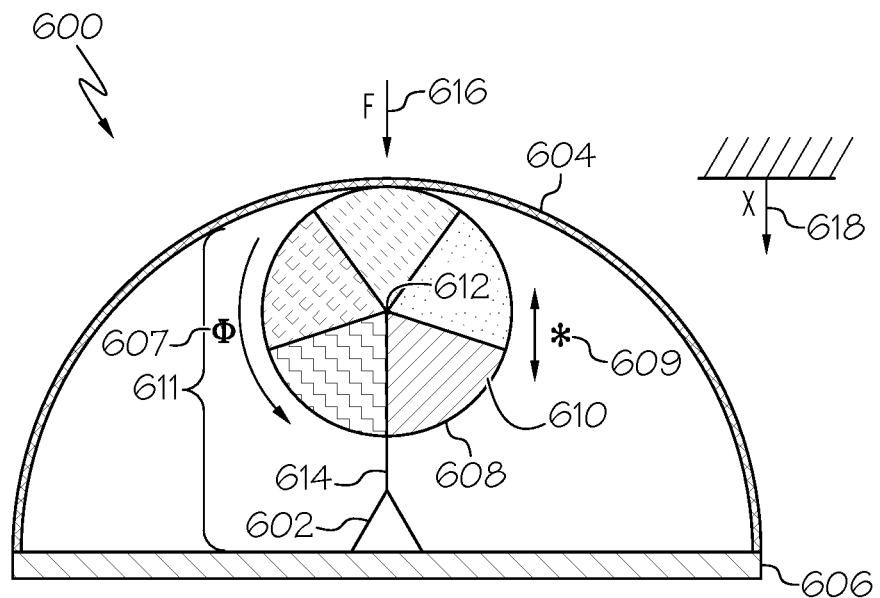
FIG. 6 schematically depicts a side view of an exemplary deformable sensor having a rotational element corresponding to the rotationally-oriented force-displacement graph depicted in FIG. 5 according to one or more embodiments described and illustrated herein.

FIG. 6 depicts a deformable sensor 600 having a rotational element 611 corresponding to the rotationally-oriented force-displacement graph depicted in FIG. 5. The rotational element 611 may include a wheel 608 or any other suitably-shaped object that can provide force-displacement modifiable in real-time within the sensor cavity, such as being rotatable. In some embodiments, multiple rotational elements 611 may be utilized to provide amounts of force-displacement that can be harmonized or diverged across the deformable membrane 604 in real-time. The wheel 608 may include any suitable number of radial portions 610, each having its own material of potentially differing stiffness (force-displacement) of any suitable stiffness (soft, spongy, hard, etc.), some radial portions 610 may comprise more than one material, and some radial portions 610 may have the same material(s) as other radial portions. The radial portions 610 may not be uniform in size, and may or may not extend from the outer surface of the wheel to the wheel center 612. The radial portions 610 may be discrete portions and/or may blend into each other. The rotational position 607 Φ of the wheel 608 may be utilized for force-displacement with respect to force 616 applied to the deformable membrane 604 (and the wheel 608 underneath) to obtain displacement 618. Any portion of the wheel 608 may house one or more actuators to turn or otherwise operate an part of a rotational element 611, such as by way of non-limiting examples a worm gear, trapeze gear, trapezoidal spindal, a hydraulic/pneumatic cylinder, and the like. Through its rotation, the wheel 608 of the rotational element 611 can modify its force-displacement value in real-time. Multiple wheels 608 may be utilized in some embodiments.

A positional sensor support member 614 may be utilized to support the wheel 608 and move it vertically, denoted as * for the vertical position 609 of the wheel 608. In this way, the positional support member 614 may move the wheel up/down to engage an object pressing against the deformable sensor in order to provide and provide force-displacement under the deformable membrane 604. Thus, the positional support member 614 may generally increase the force-displacement of the wheel 608 by raising it, and may diminish the force-displacement of the wheel 608 by lowering it. The raising/lowering of the wheel 608 by the support member 614 may be strictly vertical, or diagonal like a falling tree, for example. The positional support member 614 may move the wheel 608 in any suitable manner, such as any diagonal direction, or horizontally, to change its position within respect to the deformable membrane 604.

The positional support member 614 may be coupled to an actuation member 602 on the floor of the sensor cavity (i.e., the housing 606), or may be located in any other suitable location within the sensor cavity. In other embodiments, the positional support member 614 may be directly coupled to the housing 606. The actuation member 602 and/or positional support member 614 may individually or in combination house any suitable mechanism/machine for rotation of the wheel 608, such as by way of non-limiting example a motor, engine, actuator (worm gear, trapeze gear, trapezoidal spindal, hydraulic/pneumatic cylinder, etc.), and the like. The support member 614 may facilitate any belts, chains, cylinders, or other objects utilized in the rotation and/or movement (vertical, diagonal, etc.) of the wheel 608.

The measured stiffness due to the rotational position 607 of the wheel 608 may in turn be used as data for open-loop and/or closed-loop systems for modifying deformable sensor 100 stiffness. In some embodiments the deformable sensor 100 and/or internal sensor may receive/send various data, such as through wireless data transmission (wi-fi, Bluetooth, etc.), or any other suitable data communication protocol. For example, rotational position 607 of the wheel 608 within a deformable sensor may be specified by a rotation parameter and may affect the deformability of the deformable sensor 100. In some embodiments, receipt of an updated parameter value may result in a real-time or delayed stiffness update of the deformable sensor 100 (due to the rotational position 607 of the wheel 608 and the like). In an open-loop system, the rotational element 611 may receive input from outside the deformable sensor (such as from a user and/or a robot), wherein the input is configured to control rotation and/or movement (vertical, diagonal, horizontal, etc.) of the rotational element 611. In a closed-loop system, a floor sensor may, for example, measure an arc (i.e., rotational position 607) of the rotational element 611 or wheel 608, measure contact of the rotational element 611 with the deformable membrane 604, and control the rotational position 607 of the rotational element 611 based upon the arc of the rotational element and the contact of the rotational element 611 with the deformable membrane 604. To track or otherwise measure rotation of the wheel 608 for a closed-loop or an open-loop system, a positional or other sensor may be utilized to track movement and/or the location of the wheel 608. The positional sensor may be located within the wheel center 612 (or on/in any other portion of the wheel 608), the support member 614, the actuation member 602, the floor sensor depicted in FIG. 1, and the like. A camera or other optical visual sensor may be located externally from the wheel 608 (such as being part of the floor sensor) to observe the rotational position 607 of the wheel and/or other wheel movement (vertical, diagonal, etc.), deformation of the wheel 608 in terms of force-displacement with an object coming into contact with the deformable membrane 604, and the like. To aid in this detection of rotational position 607 and/or deformation of the wheel 608, one or more patterns (grid pattern, etc.) may be displayed on one or more portions (or the entirety of) the wheel 608.

Figure 7:
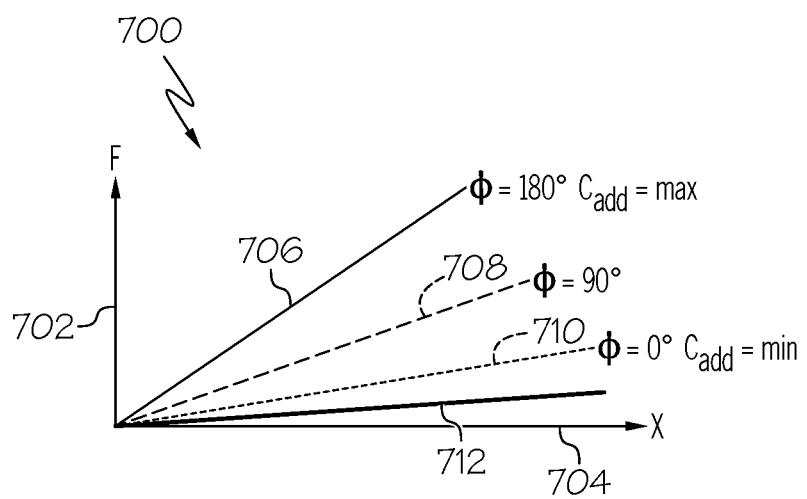
FIG. 7 schematically depicts a rotational force-displacement graph corresponding to the exemplary deformable sensor having a rotational element in FIG. 6 according to one or more embodiments described and illustrated herein.

Turning to FIG. 7, the rotational element force displacement graph 700 depicted corresponds to the rotationally-oriented force-displacement graph in FIG. 5 as well as the deformable sensor having the rotational element depicted in FIG. 6. The amount of force 702 with respect to the rotational member force-displacement 704 is plotted for multiple points of contact of the rotational member with the membrane. As shown, the force-displacement angle at 180° rotation 706 of the wheel requires the greatest amount of force 702 to obtain any given amount of displacement of the deformable sensor (i.e., this radial portion of the rotational element has the highest stiffness). This is further denoted $C_{add}$=max (i.e., the additional $C_{add}$ spring is at its maximum stiffness). The force-displacement at 90° rotation 708 of the wheel requires less force 702 to obtain any given amount of displacement of the deformable sensor. The force-displacement at 0° rotation 710 of the wheel requires the least force 702 to obtain any given amount of displacement of the deformable sensor, denoted as $C_{add}$=min (i.e., the additional spring has minimum stiffness). The no-contact 712 plot provides a baseline, in which the rotational member is not in contact with the membrane, such that some amount of force-displacement is still being provided by the air and membrane.

Figure 8:
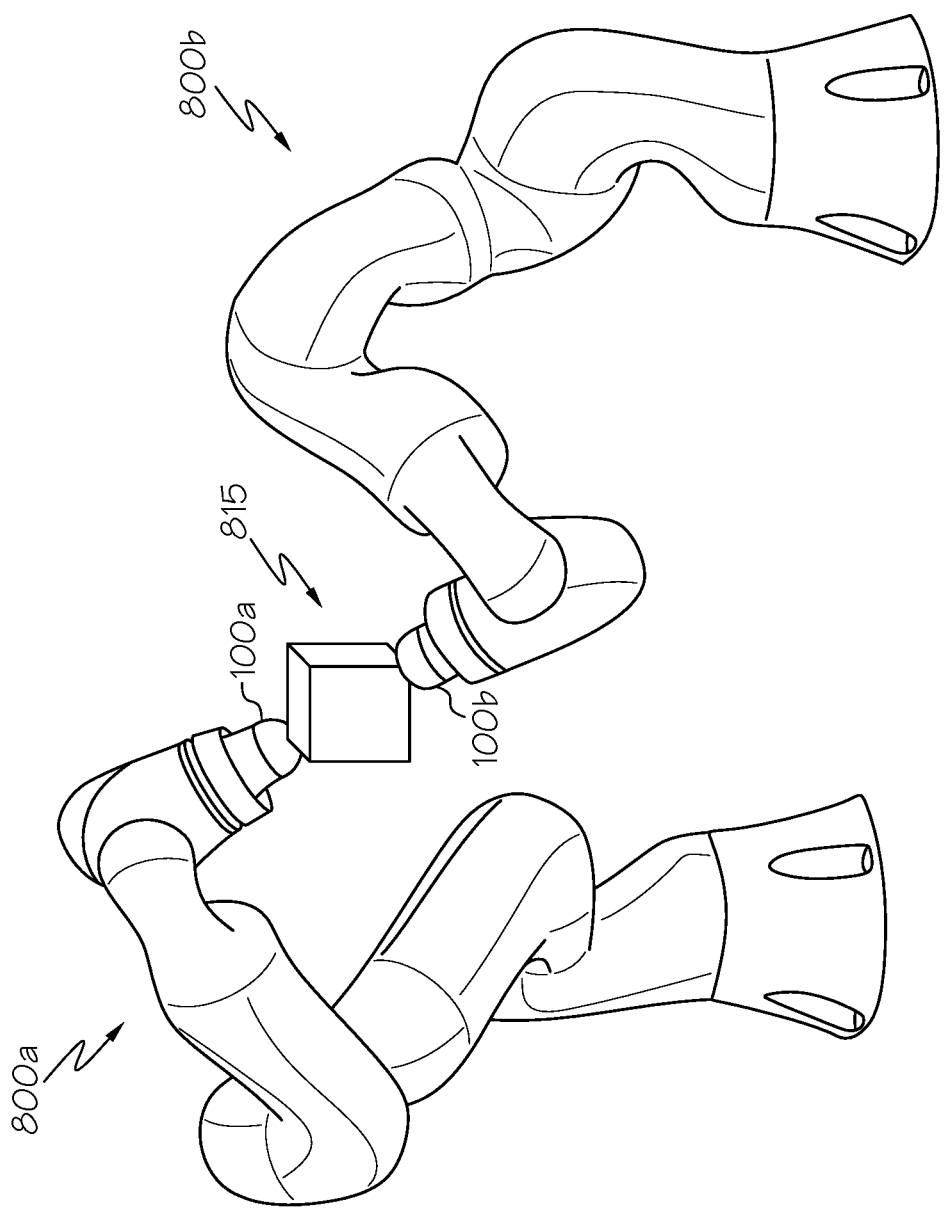
FIG. 8 schematically depicts two example robots each having a deformable sensor and manipulating an object according to one or more embodiments described and illustrated herein.

FIG. 8 schematically depicts an exemplary non-limiting first robot 800a having a first deformable sensor 100a and an exemplary second robot 800b having a second deformable sensor 100b. In this illustrated example, the first robot 800A and the second robot 800B may cooperate for dual arm manipulation wherein both the first deformable sensor 100a and the second deformable sensor 100b contact the object 815. As stated above, the deformable sensors 100 (depicted here as 100a and 100b) described herein may be used as an end effector of a robot to manipulate an object. The deformable sensor 100 may allow a robot to handle an object 815 that is fragile due to the flexible nature of the deformable membrane. Further, the deformable sensor 100 may be useful for robot-to-human contact because in some embodiments the deformable membrane may be softer and/or more flexible/deformable, rather than rigid (non-deformable or nearly so) to the touch.

In addition to geometry and pose estimation, the deformable sensor 100 may be used to determine how much force a robot 800a (or other device) is exerting on the target object 815. Although reference is made to first robot 800a, any such references may in some embodiments utilize second robot 800*b*, any other suitable devices, and/or any combinations thereof. This information may be used by the robot 800*a* to more accurately grasp objects 815. For example, the displacement of the deformable membrane may be modeled. The model of the displacement of the deformable membrane may be used to determine how much force is being applied to the target object 815. The determined force as measured by the displacement of the deformable membrane may then be used to control a robot 800*a* to more accurately grasp objects 815. As an example, the amount of force a robot 800*a* (discussed in more detail below) applies to a fragile object 815 may be of importance so that the robot 800*a* does not break the object 815 that is fragile. In some embodiments an object 815 may be assigned a softness value (or fragility value), where the robot 800*a* may programmed to interact with all objects 815 based upon the softness value (which may be received at a processor, for example, from a database, server, user input, etc.).

Figure 10:
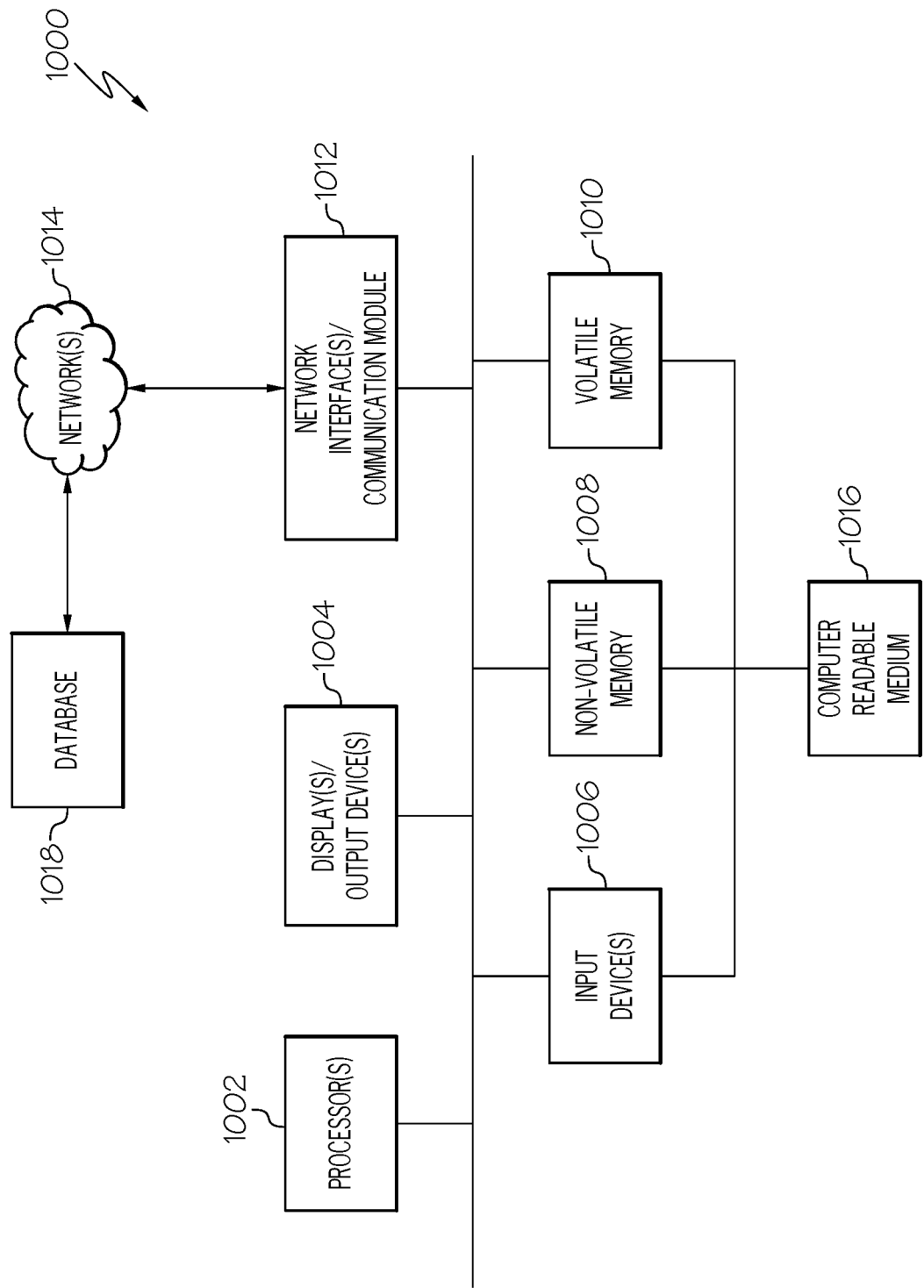
FIG. 10 is a block diagram illustrating computing hardware utilized in one or more devices for implementing various processes and systems, according one or more embodiments described and illustrated herein.
Figure 11:
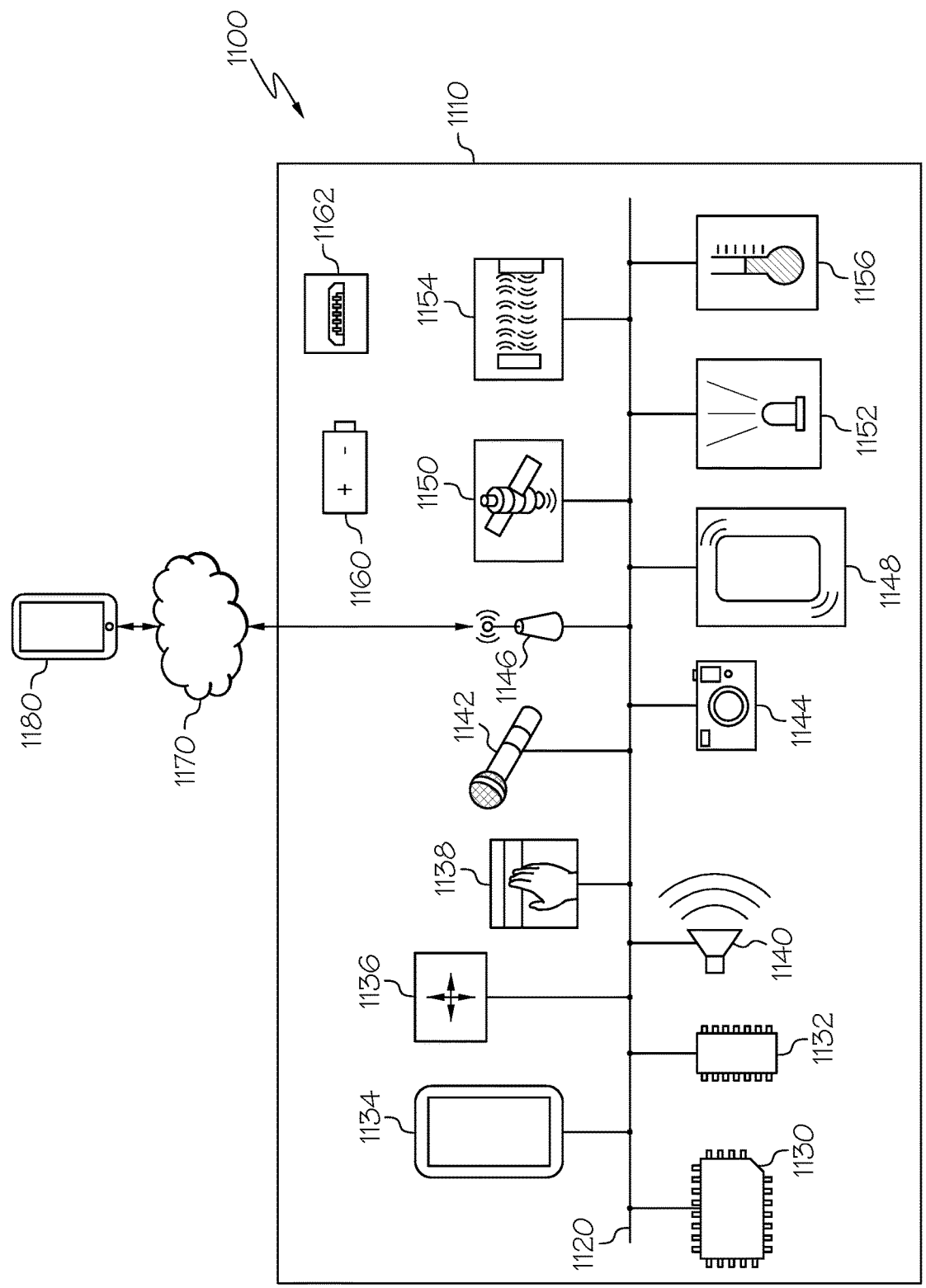
FIG. 11 is a block diagram illustrating hardware utilized in one or more robots and/or deformable sensors for implementing various processes and systems, according one or more embodiments described and illustrated herein.

In some embodiments, an open-loop control system for a deformable sensor 100*a* or a robot 800*a* may include a user interface to specify any suitable value (i.e., stiffness of the deformable sensor 100 FIG. 1 based upon rotation of the wheel, raising/lowering the wheel, air stiffness, membrane stiffness, softness value pertaining to an object 815, etc.) for initialization and/or updating (such as on a display device depicted in 1004 FIG. 10, 1134 FIG. 11, etc.). In some closed-loop embodiments, a robot 800*a* and/or floor sensors may be able to identify specific objects 815 (such as via object recognition in a vision system, etc.) whereby the object softness value may be modified, which may lead to automatic modification of the overall stiffness of a deformable sensor (such as rotating a wheel to a different radial portion having a different stiffness value and/or raising/lowering the wheel via the support member) or utilizing a different deformable sensor 100*b* having a more suitable stiffness or range of stiffness values, deformability aggregate spatial resolution, depth resolution, pressure, and/or material for the deformable membrane. In some embodiments a processor in a deformable sensor 100*a* and/or a robot 800*a* may receive data from the floor sensor representing the contact region. In various embodiments, a processor in a deformable sensor 100*a* and/or a robot 800*a* may determine a vector normal to a surface of the object based on the data representing the contact region and utilize the vector to determine which direction the object is oriented.

Figure 9:
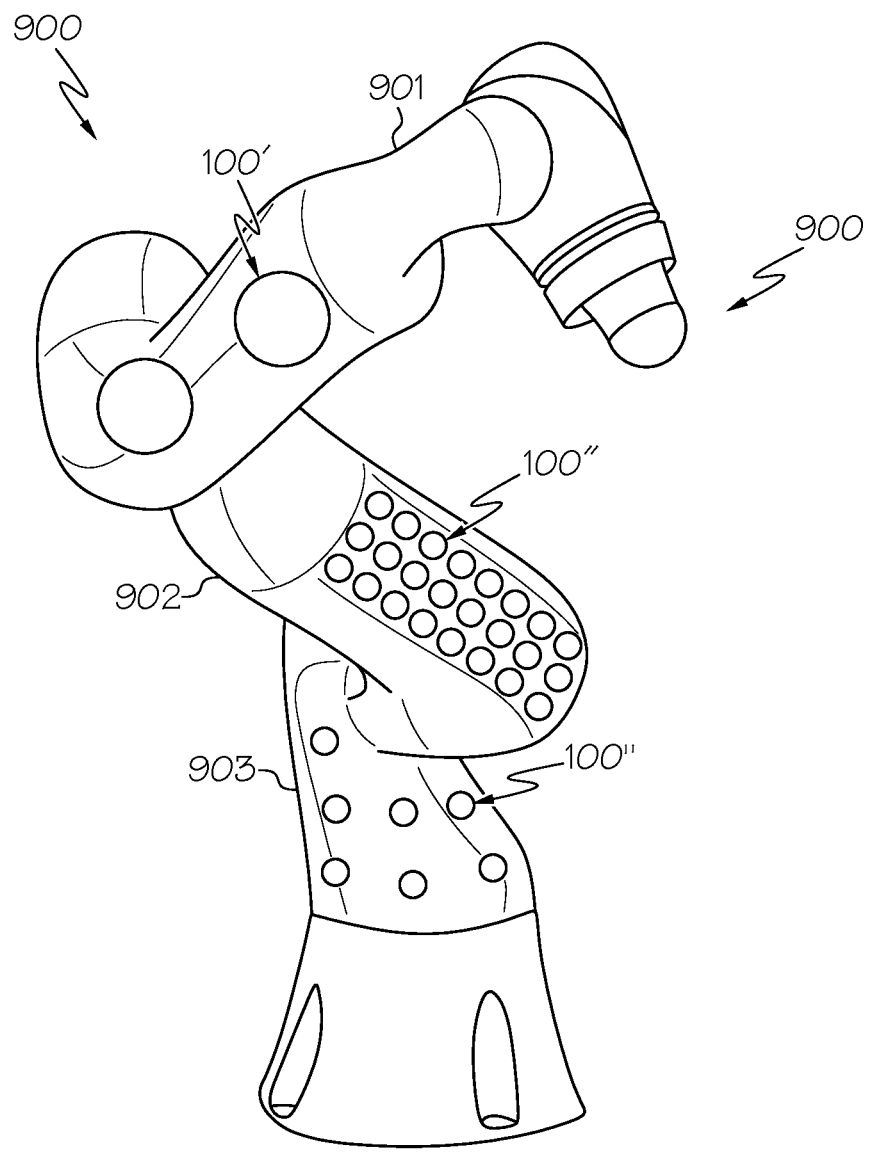
FIG. 9 schematically depicts an example robot having a plurality of deformable sensors with varying spatial resolution and depth resolution according to one or more embodiments described and illustrated herein.

In embodiments, a plurality of deformable sensors may be provided at various locations on a robot 900. FIG. 9 depicts an exemplary robot 900 having a plurality of deformable sensors 100, 100' and 100" at different locations. A deformable sensor 100 may act as an end effector of the robot 900, and have a high spatial resolution and/or depth resolution. In some embodiments, a deformable sensor 100 may have a clamp or other suitable attachment mechanism. For example, the deformable sensor 100 may be removably attached to a robot 900, and/or a robot 900 which may have features to provide for attachment and/or removal of a deformable sensor 100. Any suitable type of clamp, fastener, or attachment mechanism may be utilized in some embodiments.

Each deformable sensor 100 may have a desired spatial resolution and/or a desired depth resolution depending on its location on the robot 900. In the illustrated embodiment, deformable sensors 100' are disposed on a first arm portion 901 and a second arm portion 902 (the terms "arm portion" and "portion" being used interchangeably throughout). An arm portion may have one or more deformable sensors 100, or none at all. The deformable sensors 100' may be shaped to conform to the shape of the first arm portion 901 and/or the second arm portion 902. It may be noted that the deformable sensors 100 described herein may take on any shape depending on the application. Deformable sensors 100' may be very flexible and thus deformable. This may be beneficial in human-robot interactions. In this way, the robot 900 may contact a person (e.g., to give the person a "hug") without causing harm due to the softness of the deformable sensors 100' and/or due to an ability to control the force of the contact with an object. The spatial resolution of one or more deformation sensors 100' in the arm portions 901, 902 may be high or low depending on the application. In the example of FIG. 9, the deformable sensors 100" near the base portion 903 of the robot 900 may have low spatial resolution, and may be configured to only detect contact with a target object. The deformability of deformable sensors 100" near the base of the robot 900 may be set based on the application of the robot 900. For example, the wheel within a deformable sensor 100 may have radial portions using radial portions with materials/stiffness that are better suited to particular applications (such as placement location on a robot 900). The depth resolution and/or spatial resolution of the deformable sensors 100 may be varied along different parts of the robot 900. For example, one portion 903 it may not be necessary to identify the shape and/or pose of an object coming into contact with a particular deformable sensor 100, as simply registering contact with an object may provide sufficient information, whereas contact with another portion (such as 901) may produce pose and/or shape information derived from the contact. As shown in FIG. 9, deformable sensors 100 may be of any suitable size, which may vary even within an arm portion. Although arm portions 901, 902, 903 are depicted as being discrete/non-overlapping, overlap may occur in other embodiments.

Turning to FIG. 10, a block diagram illustrates an example of a computing device 1000, through which embodiments of the disclosure can be implemented, such as (by way of non-limiting example) a deformable sensor 100, a floor sensor 105, a wheel center 612, a robot 900, or any other device described herein. The computing device 1000 described herein is but one example of a suitable computing device and does not suggest any limitation on the scope of any embodiments presented. Nothing illustrated or described with respect to the computing device 1000 should be interpreted as being required or as creating any type of dependency with respect to any element or plurality of elements. In various embodiments, a computing device 1000 may include, but need not be limited to, a deformable sensor 100, a floor sensor 105, a wheel center 612, a robot 900. In an embodiment, the computing device 1000 includes at least one processor 1002 and memory (non-volatile memory 1008 and/or volatile memory 1010). The computing device 1000 can include one or more displays and/or output devices 1004 such as monitors, speakers, headphones, projectors, wearable-displays, holographic displays, and/or printers, for example. The computing device 1000 may further include one or more input devices 1006 which can include, by way of example, any type of mouse, keyboard, disk/media drive, memory stick/thumb-drive, memory card, pen, touch-input device, biometric scanner, voice/auditory input device, motion-detector, camera, scale, etc.

The computing device 1000 may include non-volatile memory 1008 (ROM, flash memory, etc.), volatile memory 1010 (RAM, etc.), or a combination thereof. A network interface 1012 can facilitate communications over a network 1014 with other data source such as a database 1018 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 1012 can be communicatively coupled to any device capable of transmitting and/or receiving data via the network 1014. Accordingly, the hardware of the network interface 1012 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 1016 may comprise a plurality of computer readable mediums, each of which may be either a computer readable storage medium or a computer readable signal medium. A computer readable storage medium 1016 may reside, for example, within an input device 1006, non-volatile memory 1008, volatile memory 1010, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive. For example, a deformable sensor 100, a robot 900, and/or a server may utilize a computer readable storage medium to store data received from one or more floor sensors 105.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 1000, which may be implemented in any/each of a deformable sensor 100, a floor sensor 105, an actuation member 412, a wheel center 612, a robot 900, may include one or more network interfaces 1012 to facilitate communication with one or more remote devices, which may include, for example, client and/or server devices. In various embodiments the computing device (for example a robot or deformable sensor) may be configured to communicate over a network with a server or other network computing device to transmit and receive data from one or more deformable sensors 100 on a robot 900. A network interface 1012 may also be described as a communications module, as these terms may be used interchangeably. The database 1018 is depicted as being accessible over a network 1014 and may reside within a server, the cloud, or any other configuration to support being able to remotely access data and store data in the database 1018.

Turning now to FIG. 11, example components of one non-limiting embodiment of a robot 1100 is schematically depicted, which may include components of a deformable sensor 100. The robot 1100 includes a housing 1110, a communication path 1128, a processor 1130, a memory module 1132, a display 1134, an inertial measurement unit 1136, an input device 1138, an audio output device 1140 (e.g., a speaker), a microphone 1142, a camera 1144, network interface hardware 1146, a tactile feedback device 1148, a location sensor 1150, a light 1152, a proximity sensor 1154, a temperature sensor 1156, a motorized wheel assembly 1158, a battery 1160, and a charging port 1162. The components of the robot 1100 other than the housing 1110 may be contained within or mounted to the housing 1110. The various components of the robot 1100 and the interaction thereof will be described in detail below.

Still referring to FIG. 11, the communication path 1128 may be formed from any medium that is capable of transmitting a signal such as, for example, conductive wires, conductive traces, optical waveguides, or the like. Moreover, the communication path 1128 may be formed from a combination of mediums capable of transmitting signals. In one embodiment, the communication path 1128 comprises a combination of conductive traces, conductive wires, connectors, and buses that cooperate to permit the transmission of electrical data signals to components such as processors, memories, sensors, input devices, output devices, and communication devices. Accordingly, the communication path 1128 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 1128 communicatively couples the various components of the robot 1100. As used herein, the term "communicatively coupled" means that coupled components are capable of exchanging data signals with one another such as, for example, electrical signals via conductive medium, electromagnetic signals via air, optical signals via optical waveguides, and the like.

The processor 1130 of the robot 1100 and/or deformable sensor 100 may be any device capable of executing machine-readable instructions. Accordingly, the processor 1130 may be a controller, an integrated circuit, a microchip, a computer, or any other computing device. The processor 1130 may be communicatively coupled to the other components of the robot 1100 and/or deformable sensor 100 by the communication path 1128. This may, in various embodiments, allow the processor 1130 to receive data from the one or more deformable sensors 100 which may be part of the robot 1100. In other embodiments, the processor 1130 may receive data directly from one or more floor sensors 105, which are part of one or more deformable sensors 100 on a robot 1100. Accordingly, the communication path 1128 may communicatively couple any number of processors with one another, and allow the components coupled to the communication path 1128 to operate in a distributed computing environment. Specifically, each of the components may operate as a node that may send and/or receive data. While the embodiment depicted in FIG. 11 includes a single processor 1130, other embodiments may include more than one processor.

Still referring to FIG. 11, the memory module 1132 of the robot 1100 and/or a deformable sensor 100 is coupled to the communication path 1128 and communicatively coupled to the processor 1130. The memory module 1132 may, for example, contain instructions for rotation of the wheel 608 of a deformable sensor 100 to modify its stiffness. In this example, these instructions stored in the memory module 1132, when executed by the processor 1130, may allow for the determination of the stiffness of the deformable sensor 100 based on the observed deformation of the deformable membrane 102 in view of the stiffness, rotation position, and/or vertical position of the wheel 608, the air stiffness, and/or stiffness of the deformable membrane 102. The memory module 1132 may comprise RAM, ROM, flash memories, hard drives, or any non-transitory memory device capable of storing machine-readable instructions such that the machine-readable instructions can be accessed and executed by the processor 1130. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 1132. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 11 includes a single memory module 1132, other embodiments may include more than one memory module.

The display 1134, if provided, is coupled to the communication path 1128 and communicatively coupled to the processor 1130. The display 1134 may be any device capable of providing tactile output in the form of refreshable messages, such as such as monitors, speakers, headphones, projectors, wearable-displays, holographic displays, and/or printers, for example. A message conveys information to a user via visual and/or audio information. The display 1134 may provide information to the user regarding the operational state of the deformable sensor 100 and/or robot 900.

Any known or yet-to-be-developed tactile display may be used. In some embodiments, the display 1134 is a three dimensional tactile display including a surface, portions of which may raise to communicate information. The raised portions may be actuated mechanically in some embodiments (e.g., mechanically raised and lowered pins). The display 1134 may also be fluidly actuated, or it may be configured as an electrovibration tactile display.

The inertial measurement unit 1136, if provided, is coupled to the communication path 1128 and communicatively coupled to the processor 1130 and may be located, for example, in the wheel center 612 or actuation member 602 of the rotational element 611. The inertial measurement unit 1136 may include one or more accelerometers and one or more gyroscopes. The inertial measurement unit 1136 transforms sensed physical movement of the wheel 608 into a signal indicative of an orientation, a rotation, a velocity, or an acceleration of the wheel 608. The operation of the wheel 608 may depend on an orientation of the wheel 608. Some embodiments of the wheel 608 may not include the inertial measurement unit 1136, such as embodiments that include an accelerometer but not a gyroscope, embodiments that include a gyroscope but not an accelerometer, or embodiments that include neither an accelerometer nor a gyroscope.

Still referring to FIG. 11, one or more input devices 1138 are coupled to the communication path 1128 and communicatively coupled to the processor 1130. The input device 1138 may be any device capable of transforming user contact into a data signal that can be transmitted over the communication path 1128 such as, for example, a button, a switch, a knob, a microphone or the like. In various embodiments an input device 1138 may be a deformable sensor 100 and/or an internal sensor as described above. In some embodiments, the input device 1138 includes a power button, a volume button, an activation button, a scroll button, or the like. The one or more input devices 1138 may be provided so that the user may interact with the deformable sensor 100, such as in an open-loop control system to navigate menus, make selections, set preferences, and other functionality described herein. In some embodiments, the input device 1138 includes a pressure sensor, a touch-sensitive region, a pressure strip, or the like. It should be understood that some embodiments may not include the input device 1138.

The speaker (i.e., an audio output device 1140) is coupled to the communication path 1128 and communicatively coupled to the processor 1130. The speaker transforms audio message data from the processor 1130. However, it should be understood that, in other embodiments, the robot 1100 may not include the speaker.

The microphone 1142 is coupled to the communication path 1128 and communicatively coupled to the processor 1130. The microphone 1142 may be any device capable of transforming a mechanical vibration associated with sound into an electrical signal indicative of the sound. The microphone 1142 may be used as an input device 1138 to perform tasks, such as navigate menus, input settings and parameters, and any other tasks. It should be understood that some embodiments may not include the microphone 1142.

Still referring to FIG. 11, the camera 1144 is coupled to the communication path 1128 and communicatively coupled to the processor 1130. In one embodiment, the floor sensor 105 may incorporate one or more cameras to view, for example, a grid pattern 114 on the bottom surface 112 of the deformable membrane 102 and/or a pattern on the wheel 608 to view its current orientation, rotation, and the like. The camera 1144 may be any device having an array of sensing devices (e.g., pixels) capable of detecting radiation in an ultraviolet wavelength band, a visible light wavelength band, or an infrared wavelength band. The camera 1144 may have any resolution. The camera 1144 may be an omni-directional camera, or a panoramic camera. In some embodiments, one or more optical components, such as a mirror, fish-eye lens, or any other type of lens may be optically coupled to the camera 1144.

The network interface hardware 1146 is coupled to the communication path 1128 and communicatively coupled to the processor 1130. The network interface hardware 1146 may be any device capable of transmitting and/or receiving data via a network 1170. Accordingly, network interface hardware 1146 can include a wireless communication module configured as a communication transceiver for sending and/or receiving any wired or wireless communication. For example, the network interface hardware 1146 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 1146 includes hardware configured to operate in accordance with the Bluetooth wireless communication protocol. In another embodiment, network interface hardware 1146 may include a Bluetooth send/receive module for sending and receiving Bluetooth communications to/from a portable electronic device 1180. The network interface hardware 1146 may also include a radio frequency identification ("RFID") reader configured to interrogate and read RFID tags.

In some embodiments, the robot 1100 and/or deformable sensor 100 may be communicatively coupled to a portable electronic device 1180 via the network 1170. In some embodiments, the network 1170 is a personal area network that utilizes Bluetooth technology to communicatively couple the robot 1100 and/or deformable sensor 100 with the portable electronic device 1180. In other embodiments, the network 1170 may include one or more computer networks (e.g., a personal area network, a local area network, or a wide area network), cellular networks, satellite networks and/or a global positioning system and combinations thereof. Accordingly, the robot 1100 and/or deformable sensor 100 can be communicatively coupled to the network 1170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 11, as stated above, the network 1170 may be utilized to communicatively couple the robot 1100 and/or deformable sensor 100 with the portable electronic device 1180. The portable electronic device 1180 may include a mobile phone, a smartphone, a personal digital assistant, a camera, a dedicated mobile media player, a mobile personal computer, a laptop computer, and/or any other portable electronic device capable of being communicatively coupled with the robot 1100 and/or deformable sensor 100. The portable electronic device 1180 may include one or more processors and one or more memories. The one or more processors can execute logic to communicate with the robot 1100 and/or deformable sensor 100. The portable electronic device 1180 may be configured with wired and/or wireless communication functionality for communicating with the robot 1100 and/or deformable sensor 100. In some embodiments, the portable electronic device 1180 may perform one or more elements of the functionality described herein, such as in embodiments in which the functionality described herein is distributed between the robot 1100 and/or deformable sensor 100, and the portable electronic device 1180.

The tactile feedback device 1148 is coupled to the communication path 1128 and communicatively coupled to the processor 1130. The tactile feedback device 1148 may be any device capable of providing tactile feedback to a user. The tactile feedback device 1148 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). It should be understood that some embodiments may not include the tactile feedback device 1148.

The location sensor 1150 is coupled to the communication path 1128 and communicatively coupled to the processor 1130. The location sensor 1150 may be any device capable of generating an output indicative of a location. In some embodiments, the location sensor 1150 includes a global positioning system (GPS) sensor, though embodiments are not limited thereto. Some embodiments may not include the location sensor 1150. The location sensor 1150 may also be configured as a wireless signal sensor capable of triangulating a location of the robot 1100 and/or the deformable sensor 100 by way of wireless signals received from one or more wireless signal antennas.

The motorized wheel assembly 1158 is coupled to the communication path 1128 and communicatively coupled to the processor 1130, and may correspond to the actuation member 602, the wheel 608, the wheel center 612, and/or the support member 614. The motorized wheel assembly 1158 may include motorized wheels (not shown) that are driven by one or motors (not shown). The processor 1130 may provide one or more drive signals to the motorized wheel assembly 1158 to actuate the motorized wheels such that the wheel 608 or rotational element 611 rotates, moves vertically and/or horizontally, tilts, etc.

Still referring to FIG. 11, the light 1152 is coupled to the communication path 1128 and communicatively coupled to the processor 1130. The light 1152 may be any device capable of outputting light, such as, but not limited to, a light emitting diode, an incandescent light, a fluorescent light, or the like. Some embodiments include a power indicator light that is illuminated when the robot 1100 and/or deformable sensor 100 is powered on. Some embodiments include an activity indicator light that is illuminated when the robot 1100 and/or deformable sensor 100 is active or processing data. Some embodiments include an illumination light for illuminating the environment in which the robot 1100 and/or deformable sensor 100 is located. Some embodiments may not include the light 1152.

The proximity sensor 1154 is coupled to the communication path 1128 and communicatively coupled to the processor 1130. The proximity sensor 1154 may be any device capable of outputting a proximity signal indicative of a proximity of the robot 1100 and/or deformable sensor 100 to another object. In some embodiments, the proximity sensor 1154 may include a laser scanner, a capacitive displacement sensor, a Doppler effect sensor, an eddy-current sensor, an ultrasonic sensor, a magnetic sensor, an internal sensor, a radar sensor, a lidar sensor, a sonar sensor, or the like. Some embodiments may not include the proximity sensor 1154.

The temperature sensor 1156 is coupled to the communication path 1128 and communicatively coupled to the processor 1130. The temperature sensor 1156 may be any device capable of outputting a temperature signal indicative of a temperature sensed by the temperature sensor 1156. In some embodiments, the temperature sensor 1156 may include a thermocouple, a resistive temperature device, an infrared sensor, a bimetallic device, a change of state sensor, a thermometer, a silicon diode sensor, or the like. Some embodiments may not include the temperature sensor 1156.

Still referring to FIG. 11, the robot 1100 is powered by the battery 1160, which is electrically coupled to the various electrical components of the robot 1100. The battery 1160 may be any device capable of storing electric energy for later use by the robot 1100 and/or deformable sensor 100. In some embodiments, the battery 1160 is a rechargeable battery, such as a lithium-ion battery or a nickel-cadmium battery. In embodiments in which the battery 1160 is a rechargeable battery, the robot 1100 may include the charging port 1162, which may be used to charge the battery 1160. In some embodiments, a deformable sensor 100 may be powered by the robot 1100 without utilizing a battery 1160. Some embodiments may not include the battery 1160, such as embodiments in which the robot 1100 is powered the electrical grid, by solar energy, or by energy harvested from the environment. Some embodiments may not include the charging port 1162, such as embodiments in which the apparatus utilizes disposable batteries for power.

It should now be understood that embodiments of the present disclosure are directed to deformable sensors capable of modifying their stiffness based upon different factors such as stiffness of air inside the deformable sensor, the stiffness of the deformable membrane, and/or a stiffness provided by the rotational element. The rotational element may include a rotatable wheel that can be moved vertically to increase/decrease stiffness of the deformable sensor. Additionally, by having radial portions made up of materials having differing amounts of stiffness, the wheel can be rotated to adjust its stiffness relative to the vertical movement of the wheel to modify the force it exerts against the deformable membrane, thereby affecting the stiffness of the deformable sensor as a whole.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A deformable sensor comprising:
a membrane coupled to a housing to form a sensor cavity; and
a rotational element, comprising an adjustable vertical position and modifiable rotation, supported at a base of the sensor cavity, the rotational element being configured to:
establish and withdraw contact with respect to the membrane to modify stiffness of the membrane; and
modify stiffness of the membrane by withdrawing the rotational element from the membrane.

2. The deformable sensor of claim 1, wherein the rotational element comprises a wheel and a support member.

3. The deformable sensor of claim 2, wherein the rotational element further comprises an actuation member configured to connect the support member and the base of the sensor cavity, the actuation member further comprising an actuator, wherein the actuator is configured to:
modify the length of the support member; and
rotate the rotational element.

4. The deformable sensor of claim 2, wherein the wheel comprises a plurality of discrete radial portions of which at least two have different densities.

5. The deformable sensor of claim 2, wherein the wheel comprises a plurality blended radial portions of which at least two have different densities.

6. The deformable sensor of claim 1, further comprising a positional sensor configured to measure a rotational position of the rotational element.

7. The deformable sensor of claim 1, wherein the rotational element is configured to receive input from outside the deformable sensor, wherein the input is configured to control rotation of the rotational element.

8. The deformable sensor of claim 1 further comprising a floor sensor configured to:
measure an arc of the rotational element;
measure contact of the rotational element with the membrane; and
control rotation of the rotational element based upon the arc of the rotational element and the contact of the rotational element with the membrane.

9. The deformable sensor of claim 8, wherein:
the rotational element further comprises a rotational element pattern; and
the floor sensor comprises a camera configured to measure deformation of the rotational element based upon the rotational element pattern.

10. The deformable sensor of claim 8, wherein:
the membrane comprises a membrane pattern; and
the floor sensor comprises a camera is further configured to detect deformation of the membrane based upon the membrane pattern.

11. The deformable sensor of claim 1 comprises a plurality of rotational elements.

12. A method comprising:
establishing contact within a deformable sensor between:
a membrane that is coupled to a housing to form a sensor cavity; and
a rotational element comprising a adjustable vertical position and modifiable rotation and supported at a base of the sensor cavity;
modifying stiffness of the membrane based upon contact with the rotational element; and
further modifying the stiffness of the membrane by withdrawing the rotational element from the membrane.

13. The method of claim 12, wherein the rotational element comprises a wheel and a support member.

14. The method of claim 13, wherein the rotational element further comprises an actuation member configured to connect the support member and the base of the sensor cavity, the actuation member further comprising an actuator, wherein the actuator is configured to:
   modify the length of the support member; and
   rotate the rotational element.

15. The method of claim 13, wherein the wheel comprises a plurality of discrete radial portions of which at least two have different densities.

16. The method of claim 13, wherein the wheel comprises a plurality blended radial portions of which at least two have different densities.

17. The method of claim 12, further comprising a positional sensor configured to measure a rotational position of the rotational element.

18. The method of claim 12, wherein the rotational element is configured to receive input from outside the deformable sensor, wherein the input is configured to control rotation of the rotational element.

19. The method of claim 12 further comprising a floor sensor configured to:
   measure an arc of the rotational element;
   measure contact of the rotational element with the membrane; and
   control rotation of the rotational element based upon the arc of the rotational element and the contact of the rotational element with the membrane.

20. The method of claim 19, wherein:
   the rotational element further comprises a rotational element pattern; and
   the floor sensor comprises a camera configured to measure deformation of the rotational element based upon the rotational element pattern.

* * * * *